United States Patent [19]

Bussard

[11] Patent Number: 5,281,499

[45] Date of Patent: *Jan. 25, 1994

[54] MOISTURE AND ABRASION RESISTANT HOLOGRAPHIC PRODUCTS

[76] Inventor: Janice W. Bussard, 201 N. Fruitport Rd., Spring Lake, Mich. 49456

[*] Notice: The portion of the term of this patent subsequent to Jun. 13, 2006 has been disclaimed.

[21] Appl. No.: 883,285

[22] Filed: May 14, 1992

Related U.S. Application Data

[63] Continuation-in-part of Ser. No. 647,512, Jan. 28, 1991, abandoned, which is a continuation of Ser. No. 292,826, Jan. 3, 1989, abandoned, which is a continuation-in-part of Ser. No. 147,492, Jan. 25, 1988, Pat. No. 4,838,965.

[51] Int. Cl.$^5$ .............................................. B32B 31/02
[52] U.S. Cl. ...................................... 430/1; 430/2; 2/244; 156/308.4; 156/267
[58] Field of Search ................... 40/1.5, 360; 156/267, 156/277, 308.4, 303.1; 2/244, 115, 243 R; 430/1, 2; 428/30

[56] References Cited

U.S. PATENT DOCUMENTS

| | | | |
|---|---|---|---|
| 2,729,010 | 1/1956 | Markus et al. | 156/308.4 |
| 4,038,123 | 7/1977 | Sammis | 101/129 |
| 4,329,409 | 5/1982 | Wreede | 430/1 |
| 4,589,686 | 5/1986 | McGrew | 283/85 |
| 4,725,111 | 2/1988 | Weitzen et al. | 350/3.85 |
| 4,758,296 | 7/1988 | McGrew | 430/1 |
| 4,813,351 | 3/1989 | Pierson, Jr. | 101/129 |
| 4,838,965 | 6/1989 | Bussard | 430/1 |
| 4,913,504 | 4/1990 | Gallagher | 350/3.6 |
| 4,913,990 | 4/1990 | Rallison | 430/12 |
| 4,921,319 | 5/1990 | Mallik | 350/3.6 |
| 4,933,218 | 6/1990 | Longobardi | 428/38 |
| 4,956,040 | 9/1990 | Fry | 156/267 |
| 4,998,785 | 3/1991 | Ridout | 350/3.7 |
| 5,009,943 | 4/1991 | Stahls | 428/40 |
| 5,073,222 | 12/1991 | Fry | 156/267 |
| 5,079,778 | 1/1992 | Sloot | 2/69 |

FOREIGN PATENT DOCUMENTS

| | | | |
|---|---|---|---|
| 61-292181 | 12/1986 | Japan | 430/1 |
| 62-17784 | 1/1987 | Japan | 430/2 |
| 8000462 | 3/1980 | World Int. Prop. O. | 2/244 |

OTHER PUBLICATIONS

165 National Geographic #3 Cover & pp. 372-373 Mar., 1984.

Holography Market Place, 3rd Ed. Ross Books Berkeley, Calif. pp. 64-74 Mar. 1991.

A-1 Ullmans Encyclopedia of Industrial Chemistry 5th Edition pp. 233-234 VLF, Federal Rep. of Germany, 1985.

10 Kirk-Othmers Encyclopedia of Chemical Technology 3rd Edition pp. 227-232 John Wiley & Sons, Somerset, N.J., 1978.

*Primary Examiner*—Charles L. Bowers, Jr.
*Assistant Examiner*—Martin Angebranndt
*Attorney, Agent, or Firm*—Joseph K. Andonian

[57] ABSTRACT

A product and process comprising a layered hologram and diffraction grating which will resist deterioration from abrasion and moisture as a separate article of commerce or when attached to a substrate (especially fabrics). Such resistance is accomplished by sealing the edges of the layered product and thereby protecting the embossed surface that produces the hologram image or the iridescent diffraction grating pattern. When attached to a substrate by a moisture impermeable adhesive, detachment from the substrate is also inhibited. The combination of holographic art with a printed graphic is thereby perfected.

23 Claims, 2 Drawing Sheets

MOISTURE AND ABRASION RESISTANT HOLOGRAPHIC PRODUCTS

CROSS-REFERENCE TO PREVIOUS APPLICATIONS

This application is a continuation-in-part of my co-pending application Ser. No. 647,512 filed Jan. 28, 1991, now abandoned, which application was a continuation of my then co-pending application Ser. No. 292,826 filed Jan. 3, 1989, now abandoned, which application was a continuation-in-part of my then co-pending application Ser. No. 147,492, entitled "HOLOGRAPHIC ART APPLIED TO T-SHIRTS OR OTHER TEXTILE PRODUCTS", filed Jan. 25, 1988, now U.S. Pat. No. 4,838,965, issued Jun. 13, 1989.

DESCRIPTION

1. Technical Field

This invention relates to moisture and abrasion resistant holographic materials (holograms or diffraction-gratings) which are affixed to, or are capable of being affixed to, substrates (especially fabrics). The invention is particularly suitable for products that are exposed to considerable wear and tear during use, such as brought about by repeated washing and drying, over the useful life of the substrates (especially clothing).

2. Background Prior Art

Holography has been used widely in a variety of applications to reproduce three-dimensional images. U.S. Pat. No. 4,589,686 describes usage for anticounterfeiting purposes such as on credit cards, probably the most widely recognized use at the present time. The same patent also discloses many other patents relating to diffraction grating patterns and three-dimensional images of objects and scenes. The cover of the National Geographic issue of March, 1984, is another example of use to increase the attractiveness of the magazine to the naked eye. The same issue of the National Geographic contains a good description of holography.

The first successful use of holographic materials on fabrics was originally disclosed in my parent application Ser. No. 147,492 filed Jan. 25, 1988, now U.S. Pat. No. 4,838,965. Since that time two other applications have been filed on behalf of another inventor claiming a different method of attaching holograms to textile wearing apparel. These applications have issued as U.S. Pat. Nos. 4,956,040 and 5,073,222. These methods achieve resistance to repeated washings by enveloping a precut hologram between a clear polyester coating and an adhesive scrim backing and then adhering the resulting laminate to wearing apparel with the adhesive in the scrim The addition of a separate polyester layer on top of the hologram and scrim underneath adds two layers which reduce flexibility and increase stiffness in a product where a "soft hand" is highly preferable. In addition the separate polyester layer that is not embossed interferes with the clarity of the holographic image.

The holograms and diffraction gratings disclosed in my U.S. Pat. No. 4,838,965 as well as those manufactured and sold today for application to various substrates are already multi-layered products. Although other layers may be present depending on the manufacturer, all of these products contain an embossed plastic carrier, a reflective metallic layer, and an adhesive backing. For present purposes the adhesive material is generally activated by heat and pressure to attach the holographic materials to appropriate substrates and is generally referred to as an iron-on adhesive. The embossed surface of a metallized plastic carrier actually reproduces the three-dimensional image or pattern when light is reflected through the plastic by the metallic layer. This means of reproduction is most commonly referred to as embossed holography. A more complete description can be found in Chapter 9 of Holography Marketplace, Ross Books, March, 1991. These holograms and diffraction gratings are generally available in sheets of film or foil bearing images or patterns on a repetitive or continuous basis throughout their length and breadth. The sheets are at least six inches wide and are usually sold in rolls up to two hundred feet long. The purchaser can cut the images or patterns out of the sheets to suit his needs. For example, the hologram of the Golden Gate bridge depicted in FIG. 1 would be repeated throughout a commercially available sheet bearing many reproductions of that holographic image The purchaser can cut each image of the bridge out of the sheet and attach it to whatever substrate he deems appropriate for his purposes. For example, such holograms can be affixed by the mechanized hot stamping process to the paper cover of a magazine such as the National Geographic issue referred to above while the manual pressure sensitive process would be suitable for small quantities.

Strictly speaking, a diffraction grating is not a hologram but the commercially available version of such products have essentially the same structure as an embossed hologram, namely an embossed surface on the metallic side of a metallized plastic film with an adhesive covering the embossed surface. The embossed surface reflects light to produce a pattern of iridescent colors which vary depending on the position of the light, the orientation of the diffraction grating or the position of the viewer. Since the problems associated with the structure of a diffraction grating as well as its attachment to a substrate are essentially the same as for a hologram, it is considered to be the eguivalent of the hologram for purposes of the present invention. The word "holographic" when used in this specification in combination with "products", "materials" or "films" can be taken to include both holograms and diffraction gratings.

OBJECTS OF THE INVENTION

A principal object of the present invention is to provide holographic (including diffraction grating) materials which can be easily attached to water permeable or impermeable substrates in a manner which will resist separation or damage even after complete and repeated immersion in water.

Another object of the present invention is to provide an interfaced assembly which comprises an embossed plastic carrier layer, a reflective metallized layer, a water impermeable adhesive layer, and a water impermeable seal at the perimeter which effectively resists separation of the assembly even after repeated laundering in water and subsequent drying.

Still another object of the present invention is to provide a visual display on a fabric substrate combining holographic images or diffraction grating patterns with printed graphics. The printed graphic can be affixed directly to the top surface of the holographic materials or can be placed directly on the fabric substrate physically separate from the holographic materials.

A still further object of the present invention is to provide combinations of holographic materials and fabrics backed by interfacings.

Other objects will become apparent to those skilled in the art by the disclosure that follows.

DISCLOSURE OF THE INVENTION

The present invention concerns a modification of commercially available holographic materials to make them more suitable for application to fabrics and other materials that are subjected to considerable wear and tear in ordinary use, such as that resulting from repetitive washing and drying throughout their useful lives. Especially because these modified holographic materials are suitable for use on washable fabrics, the present invention also makes it practical to combine holographic art with a printed graphic on a fabric substrate. Without appropriate modification these commercially available, multi-layered materials will delaminate and deteriorate rapidly enough to make such use impractical. Most often the top layer of the holographic material will separate by abrasion and/or by penetration with water and the three-dimensional or iridescent effect will deteriorate significantly or be lost completely. Likewise without a suitable adhesive the holographic material will separate wholly or partly from the substrate. The adhesive should not only protect the embossed surface of the holographic material but also firmly attach the holographic material to the substrate over the life of the resulting assembly. Since the substrate is not always completely smooth, as is the case with porous woven fabrics, it is also important that the adhesive provide a suitable surface for engagement with the holographic materials. Otherwise the holographic image will be distorted by the irregularities in the porous substrate. As will be shown infra, the use of a film layer between the holographic material and a substrate with an irregular surface can also prove advantageous.

The plastic layer of these commercially available holographic and diffraction grating films is most commonly thermoplastic polyvinylchloride (PVC) but polyester is also used it should be thin enough to be transparent and pliable and yet tough and moisture impervious enough to protect the holographic materials from deterioration by exposure to moisture and abrasion. polyethylene and polypropylene are also acceptable and may be superior in some respects. This plastic layer usually varies in thickness from 0.075 to 0.20 mm. Other films with varying properties that can be used are described in Kirk-Othmer's Encyclopedia of Chemical Technology, Third Edition, John Wiley & Sons, 1978, beginning on p. 227 of Volume 10. Of particular importance for present purposes are the following characteristics: transparency, water or moisture permeability, thermal properties under the conditions of manufacture and use, and resistance to abrasion.

A suitable adhesive backing is a moisture impermeable thermoplastic which is usually characterized commercially as an "iron-on" adhesive. These adhesives are predominantly polyester or polyacrylic in character and require heat and pressure to activate. Adhesives that are chemically cross-linked and bound to fabrics when activated are also useful for the present invention as will be shown hereinafter.

The hologram image or diffraction grating pattern in these products is generally stamped with a stamping die or shim into a thin mirror-like metallic foil vacuumized to one side of a plastic carrier material. When light passes through the plastic carrier, it is reflected back through the plastic by the metal foil in a diffused pattern to display the three-dimensional holographic image or diffraction grating pattern embossed into the plastic-metal sandwich. The metal foil consists of aluminum which is never altered in color. Holographic foil can be colored by (1) adding a tint or dye lacquer coat over the top of the polyester carrier, (2) using a tint or dye to color the polyester during its manufacture, (the only practical option for bonding to fabrics) or (3) adding a lacquer tint or dye as a separate layer between the polyester carrier and the metal foil. Additional layers of various materials are also commonly found in these holographic products. However, the only critical materials for purposes of the present invention are the embossed carrier layer, the metallic layer and the adhesive bottom layer which in combination reflect a three-dimensional image or iridescent pattern in the presence of light and permit appropriate attachment to substrates.

Instead of embossing the holographic image or diffraction grating into metal-backed plastic carrier, the plastic carrier itself can be embossed and the metal coating can be deposited on the embossed surface afterwards. Further information on processes for making embossed holograms can be found in U.S. Pat. 4,913,504.

Holopak Technologies. Inc. of East Brunswick, N.J., Dazzle Enterprises, Inc. of Richmond, Va., Diffraction Company of Riderwood, Md., and Sealtran of Chicago, Ill., are examples of companies from which iron-on holograms and/or diffraction gratings can be obtained for use in the process and product of this invention.

When iron-on holograms and diffraction gratings described above are affixed by heat and pressure to fabric substrates coated with thermoplastic silk screening inks as described in my earlier applications, the combination of adhesive and ink not only bonds the holograms or diffraction gratings firmly to the fabric but also envelopes the edges along the perimeter of the holograms or diffraction gratings. The bond thus-formed resists separation of the holograms or diffraction gratings from the fabric even after repeated washing but also greatly reduces damage to the completely encapsulated embossed surface. When the hologram or diffraction grating is embedded in the adhesive, the edges of the film are no longer exposed and thereby easily damaged by physical contact with any other object. When immersed in water, the thereby encapsulated hologram or diffraction grating is almost completely protected from moisture and physical abuse.

Screen printing inks designed for use on fabrics mechanically bond to fabrics after curing with heat. These water impermeable inks, generally known as plastisols, are also useful, either alone or in combination with iron-on adhesives, for bonding holograms or diffraction gratings to fabrics. Plastisol inks are actually adhesives containing pigments and consist mostly of a plasticizer and polyvinyl chloride resins which require heat to cure and dry. The Union Ink Company, Inc., of Ridgefield, N.J., is an example of a company that sells plastisol inks. Plastisols are described in greater detail in Ullman's Encyclopedia of Industrial Chemistry, Fifth Edition, VCF, 1985, on page 234 of Volume A1.

Adhesives that are useful to bond layers of various washable fabrics together are also generally useful to attach holographic materials to fabrics providing they are moisture impermeable and the edges of the holographic materials are sealed. Several of these adhesives are disclosed in U.S. Pat. No. 5,009,943 and the other patents and the copending application incorporated by reference therein. The hot melt adhesives such as disclosed on pages 233 and 234 of Volume A1 of Ullman as indicated above are especially useful for bonding to fabric substrates by the process disclosed in this specification. Still another form of adhesive that can be used is the dry film adhesive that can be reactivated by heat such as used on iron-on patches.

Fabric substrates that are suitable for the present invention include, but are not limited to, cotton, polyester, acrylics, wools, heat resistant nylons, and vinyls. Cotton, polyesters or mixtures of the two are preferred.

Water permeable substrates other than fabrics can also be utilized with the holographic materials of the present invention. For maximum resistance to moisture and abrasion, all such substrates must be bonded to the holograms or diffraction gratings with a water impermeable adhesive, preferably one that is also capable of sealing and enveloping the perimeter of the hologram or diffraction grating.

Substrates that are themselves water impermeable, such as, metal, wood, leather, fiberboard, glass, paper and plastic, can also be utilized for the product and process of the present invention, but it is still necessary to protect the edges of the holograms and diffraction gratings to reduce their tendency to delaminate. The use of a water impermeable adhesive which envelopes and seals the perimeter of the hologram or diffraction grating so that moisture cannot penetrate and loosen the layers of the hologram or diffraction grating materials is an important feature of the present invention.

My original invention consisted of attaching commercially available holograms to fabrics (especially T-shirts), already coated with screen printing inks, by heat and pressure to seal the edges of the hologram and provide a water impermeable interface between the hologram and the fabric. The resulting product also provided a total graphic combining three-dimensional holographic or iridescent diffraction grating art with printing to form a hitherto unavailable artistic effect on clothing. The silk screening inks used in that inventive embodiment contained a blowing agent or finely ground polystyrene which was believed to be essential to effect a satisfactory seal at the edges of the holographic material. This product resisted washing and drying better than had previously been achieved by any other means. The same basic characteristics of providing resistance to water and mechanical damage can also be achieved without polystryrene by sealing the edges of a hologram or diffraction grating in the absence of a substrate first and then affixing the hologram or diffraction grating to the substrate utilizing a water impermeable adhesive. The 3M Center of St. Paul, Minn., sells a dry, spun adhesive product designated as 3895 which can be utilized to laminate a hologram whose edges have previously been sealed to a substrate by the application of heat at 300 degrees Fahrenheit and 40 psi of pressure for 8 to 10 seconds. 3895 is a fast crystallizing thermoplastic polyester adhesive in non-woven form. The edges at the perimeter of the hologram or diffraction grating can be sealed, for example, by using heat and pressure on an iron-on hologram or diffraction grating cut to the desired size and shape sandwiched between two layers of a teflon coated fabric. The adhesive on the bottom layer of the hologram or diffraction grating will not adhere to the teflon coated fabric but will envelope and seal the edges of the hologram or diffraction grating. The 3M adhesive described above can then be used to attach the hologram or diffraction grating to the desired substrate. By sealing the edges of the holographic materials first before attachment to a substrate, the attachment process is simplified and can be carried out more conveniently as a separate step.

Another time-saving yet effective method of sealing the edges of holographic materials and still provide an impervious barrier between the holographic materials and various substrates involves the use of an adhesive-backed urethane base film such as those being marketed by Stahl's of 20600 Stephens Drive, St. Clair Shores, Mich., 48080, under the trademarks Thermo-FILM and Pro-Grip II. One Thermo-FILM adhesive fuses via a heat-activated "electromolecular" action to form a permanent, flexible chemical bond to a fabric substrate. Stahl's pro-Grip II is another lettering material backed by an adhesive formulation sold as SAF-90 which cross-links when heated to form a stretchable epoxy-like permanent bond on most fabrics. These films are being sold by Stahl's primarily for use as lettering materials for athletic apparel. The present invention consists in part of the recognition that these films can also be used to attach holographic materials to various substrates including but not limited to athletic apparel. Thermo-FILM and pro-Grip II differ primarily in the adhesive used on the back side of the film. The Thermo-FILM adhesive is a fast heat-activated polyester which produces a strong chemical bond to most woven and knitted fabrics including cotton, cotton and polyester blends, acrylic and acrylic blends, and polyester foam. The Grip adhesive, separately trademarked as SAF-90, contains cross-linking chemicals, and is designed primarily for use with more impermeable fabrics such as Spandex/Lycra, triacetate, siliconized satin and waterproofed nylon. Both films combine a lightweight all-purpose thermo-plastic with a urethane base which is capable of adhering to fabrics with a soft hand and a high abrasion resistance without cracking or peeling. Both films can be applied quickly, easily and permanently to fabrics, provide moisture impervious bonds to the fabrics and effectively seal the edges of the holographic materials. Both films can also provide a slightly enlarged background for smaller contiguous holographic images, letters, numerals and symbols in the foreground. Vinyl films can also be used in the same way but are inferior because they are capable of forming only a mechanical bond to substrates, are less resistant to heat, and are less durable.

Some fabric products, such as costumes, scarves, tote bags and caps, require little or no laundering and therefore less strength and durability in the impervious barrier at the edges of holographic materials affixed thereto. However, an auxiliary adhesive is required to complement the polyester adhesive normally provided on the back side of commercially available holographic materials to create a strong bond to such products as well as seal the edges to the extent required. For such substrates, especially a cap, the primary adhesive may be a part of the cap's structure, i.e. the stiffening in the frontispiece of the cap. This stiffening may be a non-woven interfacing or a woven material such as buckram which is available in varying denier. Both of these products contain a resin, glue or glue-like coating to add a firm texture or rigidity to the product.

Other fusible non-woven interfacings containing adhesives for auxiliary use to attach holographic materials are available by the yard in varying millimeter thicknesses from several manufacturers including Sheer Fuse from Stacy Fabrics Corporation, 38 Passaic Street, Wood-Ridge, N.J., 07075; Stitch Witchery from Dritz Corporation, Spartanburg, S.C., 29304; and Wonder Web SL8/SL80 or 368 by the Pellon Division, Freudenberg Nonwoven, 119 West 40th Street, New York, N.Y., 10018.

Still other suitable auxiliary dry adhesives can be obtained from Stahl's and the Pellon Division at the addresses previously described as well as Therm-O-Web, Inc. 112 W. Carpenter, Wheeling, Ill., 60090. Finally a similarly suitable product designated as No. 3895 by its manufacturer, 3M, 3M Center, St. Paul, Minn. 55101, is a fast crystallizing thermo-plastic non-woven spun adhesive.

Among the many products, besides T-shirts, suitable for displaying holographic art are sweatshirts, sweatpants, skirts, slacks, jackets and other wearing apparel; flags, pennants, baskets, notebooks and boxes; and many home and office products including paper products such as napkins, place mats, plates, cups and glasses, stationery, catalogs, brochures, business cards and advertising flyers, holiday ornaments and wreaths, greeting cards, party decorations, wall hangings, window shades, window curtains and tie backs, towels and pot holders, shower curtains, lamp shades, picture frames, bedspreads and dust ruffles, waste baskets and the like. Each of these products is readily adapted for application of holographic art with any of the bonding applications disclosed herein to assure abrasion resistance and moisture impermeability. Even to the extent the various articles disclosed are not subjected to repeated laundering, they are all exposed to moisture in varying degrees and therefore subject to deterioration over time if the holographic materials used do not have sealed edges and are not firmly sealed to their substrates.

A very recent advance in technology is now on the market and provides a mechanical flatbed computerized machine that was developed to cut polyester fabrics to programmed specifications with a heated iron tip. The fabrics are generally cut to form letters, numerals, words and images for attachment to wearing apparel, primarily athletic products. The cut edges are sealed well enough to resist fraying and penetration by water. The machine is marketed by Stahl's, 20602 Stephens Drive, St. Clair Shores, Mich., 48080, under the trademark TEXICUT. Surprisingly the machine also seals the edges of holographic materials even though the top layer of the holographic materials generally consists of a polyester film while the bottom layer generally consists of a dry adhesive. How the hot tip at about 400 degrees Centrigrade seals these two layers along with their metallic interface together and thereby prevents moisture from penetrating between the layers of that interfaced assembly is not clear. It is clear, however, that holographic materials cut with this machine are more resistant to separation and deterioration after many washing and drying cycles than any such products produced in any other way. It is also clear that holographic materials produced using this machine can now be marketed directly to the consumer market and small screen printers and retail establishments for bonding to various substrates with simple heat transfer machines and even household irons.

Following this discovery it is now possible by combining existing technology to automate completely the process of producing holographic materials interfaced to various substrates by visually scanning artwork electronically, transferring the image into a CPU connected to hot cutting equipment with interchangeable templates positioned to out sheets of holographic materials and thereby seal the edges in one operation, and conveying the cut materials to substrates for bonding with heat and pressure.

In my previous patent applications, of which the present application is a continuation-in-part, the perimeter of the holographic materials was sealed in the course of attaching the materials to a substrate. The resulting product was thereby made resistant to separation and damage from wear and tear during ordinary usage such as would result from repeated washing and drying. In the preferred embodiment of the present invention, the perimeter is sealed before attachment to the substrate. Although the seal can be accomplished in many ways, the preferred method involves the use of a mechanical hot-tipped cutter when the hologram or diffraction grating is cut out of the sheets or rolls in which these materials are normally supplied in the desired configuration for attachment to a substrate. The edges can also be sealed using the same adhesive materials that are disclosed herein for attaching the holographic materials to substrates. The ordinary iron-on adhesives supplied by manufacturers on the underside of sheets of holographic materials can be coaxed over the edges of the cut-outs from the sheets by placing the cut-outs between two sheets of material to which the adhesives will not adhere, such as teflon coated paper or fabric, and applying heat and pressure. A commercially available non-woven polyester fiber sheet of adhesive such as supplied by the 3M company can then be used to attach the holographic materials to substrates. By separating the sealing of the edges from attachment to a substrate, those who wish to attach the holographic materials to substrates have greater flexibility and considerably less difficulty in making the attachment. A simple iron such as can be found in almost every residence or an ordinary heat transfer machine can be used for this purpose.

None of these drawings is drawn to scale.

MORE DETAILED DESCRIPTION OF THE PREFERRED EMBODIMENT

Figure 6:
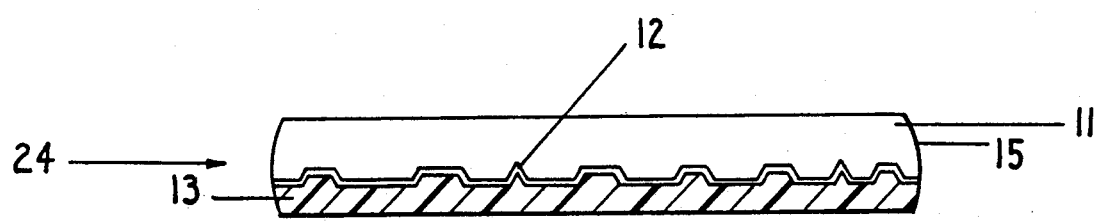
FIG. 6 is a cross-sectional view of a hologram whose edges have been sealed by heat and pressure such as brought about by a hot-tipped cutting machine.

The most preferred embodiment of the present invention is illustrated in FIG. 6 of the drawings. The hologram 24 depicted there comprises an embossed plastic carrier 11, a mirror-like metallic backing 12, an adhesive layer 13 and a sealed edge 15 which is moisture impervious. A diffraction grating could have the same structure differing from the hologram only in the character of the embossed surface to reflect a repetitive iridescent pattern of colors rather than reproducing a scene such as the Golden Gate Bridge depicted in FIG. 1. When this embodiment is attached to a substrate, less time, effort and equipment is required to achieve the desired degree of resistance to moisture and abrasion. The previously described TEXICUT machine can be used to cut and seal the edges of the holographic materials simultaneously. The machine can be programmed to cut holographic materials in shapes and sizes much more complex than the Golden Gate Bridge by first scanning the artwork with a computer and a scanning program such as photo Finish. The image is then traced automatically using Adobe Streamline followed by digitization of the image with a Conversion program and copying onto a disk The disk is inserted into the TEXICUT machine, the basic commands are keyed into its control panel to indicate the desired size, quantity and choice of one or two colors. Finally the holographic material is tacked down on the flatbed, the iron tip of the machine slowly outlines, cuts and seals the edges of the holographic material in sizes ranging from ½ to 12 inches in height simultaneously. The cut and sealed holographic materials can then very easily be attached to substrates 14, including fabrics such as the T-shirt 19 depicted in FIG. 1 with heat transfer machines as described in my prior filed copending application Ser. No. 647,512, or even by do-it-yourselfers with a household iron at approximately the same temperature and for the same amount of time. Heat of approximately 330 degrees Fahrenheit for about 8 seconds is sufficient for such attachment.

The iron-on adhesives available on commercially available holographic materials provide satisfactory bonds to fabrics if the edges are first sealed as indicated above. However, for certain fabrics and other substrates, the SAF-90 and GRIP adhesives available from Stahl's may be superior. In fact, as depicted in FIG. 7, the use of Thermo-FILM and Pro-Grip II films 21 which already have these adhesives as base materials 22, provide even more effective seals to fabric substrates when used as intermediate layers between holographic materials with iron-on adhesives 13 and fabric substrates 14 and 20.

Figure 7:
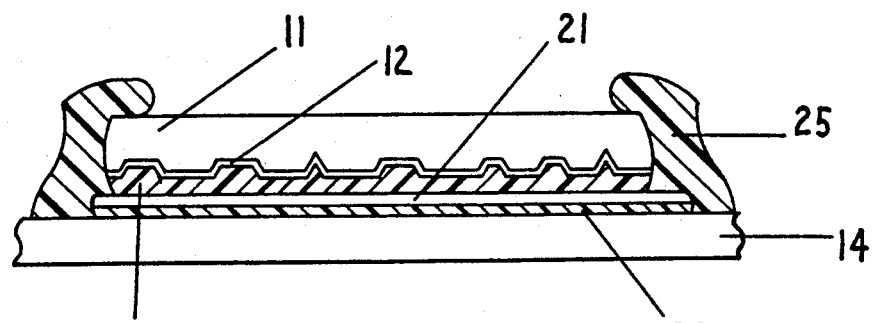
FIG. 7 is a cross-sectional view of a hologram attached to a substrate with an adhesive-backed film between the hologram and the substrate.

Appropriate steps to apply the background Thermo-FILM 21 with the foreground holographic art as a unit as depicted in cross-section in FIG. 7 are as follows: preheat a heat transfer machine to 330 degrees Fahrenheit; pull down the heated upper platen to the bottom platen and preheat for 60 seconds; separate the garment such as the T-shirt 19 depicted in FIG. 1 and load it onto the bottom platen of the machine and heat with the upper platen for 5 to 10 seconds to remove moisture and chemical treatment from the fabric; align the Thermo-FILM 21 appropriately with the intended design; place the holographic art as depicted in cross-section in FIG. 2 in perfect registry to the foreground with the film background 21; and cover the entire graphic assembly with protective silicone paper. The upper platen is locked into position with firm pressure for 8-10 seconds at 330 degrees Fahrenheit and released; the protective paper covered assembly is rubbed immediately with a heat eraser and moderate pressure for 10 seconds after which the paper is flipped over and rubbed again before removing it. The bonding process is completed whereby the T-shirt 19 in FIG. 1 displays holographic art 17 with sealed edges flush with the fabric surface and/or a combination comprising holographic art integrated into other printing 18 for the creation of a total graphic on a fabric substrate 9. The bonding process utilized heat and pressure to melt the polyester adhesive back-coating of the Thermo-FILM and the holographic art simultaneously; the thermo-plastic impervious barrier resisted penetration thereby forcing the molten adhesive up and around the edges of the multi-layered holographic art creating a durable seal 25 which resisted abrasion and as many as 40 washings and dryings in home washing equipment.

Pro-Grip II with SAF-90 adhesive backing can be used as an impervious barrier in conjunction with holographic art for hard-to-penetrate fabrics such as siliconized satin and waterproofed satin. However, it requires a two-step bonding process--one for the background Pro-Grip and one for the holographic art. The SAF-90 adhesive has a low viscosity when liquidized, thereby making it easier to soak into waterproofed fabric such as nylon. However, the bonding process requires heavy pressure for 30 to 40 seconds followed by the second step of registering and applying the holographic art with firm pressure for 8 to 10 seconds at 330 degrees Fahrenheit.

Vinyl can also be used as an impervious barrier in place of the thermoplastic film in combination with holographic art and applied exactly the same way as described above for use of Thermo-FILM. However, the thick vinyl is inferior to the thermoplastic film because it comprises a PVC low melt plastic base which is only capable of forming a mechanical bond to fabrics. Vinyl is less desirable than thermoplastic because it doesn't withstand heat as well and is less durable.

Since some fabric products require little or no laundering, the seal at the edges of the holographic art does not require as much strength and durability or care and attention in preparation. However, an auxiliary adhesive may still be desirable to complement the polyester adhesive found on the backside of holographic art to seal the edges and create a strong bond to such products as costumes, scarves, tote bags and caps In the case of a cap, the primary adhesive may be included as a part of the cap's structure, i.e., the stiffening in the frontispiece of the cap. This material may be a non-woven interfacing or a woven material, such as buckram, available in varying denier, both of which contain a resin, glue or glue-like coating for adding firmness in texture or rigidity to the product. Under heat and pressure in the same way that Thermo-FILM was applied above, the glue or glue-like coating on the interfacing or buckram penetrates the fabric from the rear or inside of the cap and blends with the molten adhesive from the backside of the holographic material as it penetrates the fabric from the front. The excess of the blended adhesives oozes around the edges of the holographic material and a permanent seal is accomplished. If the weave or the knit of the fabric substrate is visible through the holographic material after the heat and pressure application thereby detracting from the holographic image, then it is advisable to sandwich a thermoplastic film such as Thermo-FILM between the fabric substrate and holographic art instead of the auxiliary adhesive and thereby present a smooth surface to the back of the holographic art. If the fabric in the hat or other product is too thick or impervious to allow the adhesive in the interfacing to pass through the fabric (such as would be the case for a cap which has a layer of thick foam on the front portion of the cap to absorb sweat), a dry polyester adhesive that can be purchased by the yard can be added between the fabric and the iron-on hologram to provide sufficient adhesive to seal the edges effectively.

The other fusible nonwoven interfacings, such as Sheer Fuse and wonder web SL8/SL80 or 368 referred to earlier, can also be used as auxiliary adhesives for the application of holographic art. These interfacings are cut to match the size of the holographic art and sandwiched between the art and the textile product. A successful bond with sealed edges is formed by heat and pressure in the same manner as indicated above for Thermo-FILM.

Other dry polyester hot melt adhesives, such as the 3M 3895 referred to above, can also be cut to match the size and shape of the holographic art and sandwiched between the fabric and adhesive backed holographic art to seal the edges and bond to the desired product by using the same procedure followed in bonding the fusible non-wovens above.

Figure 1:
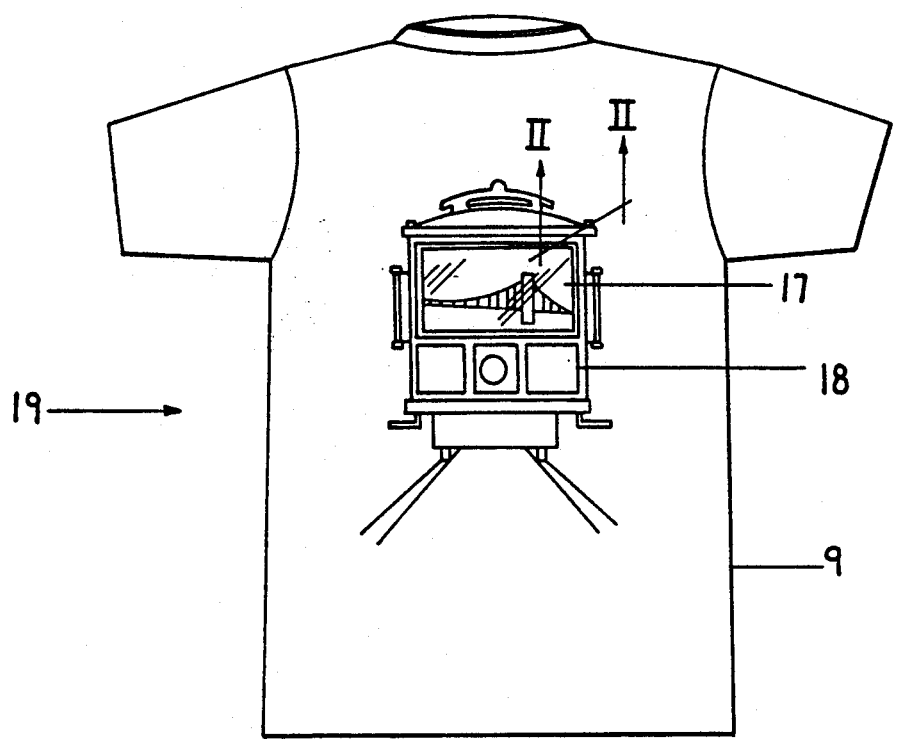
FIG. 1 is a front elevational view of a T-shirt illustrating one embodiment of the present invention.
Figure 2:
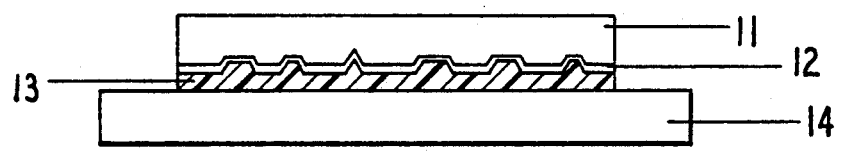
FIG. 2 is a greatly enlarged cross-sectional view taken on line 2—2 of FIG. 1 if no attempt had been made to seal the edges along the perimeter of the hologram.
Figure 3:
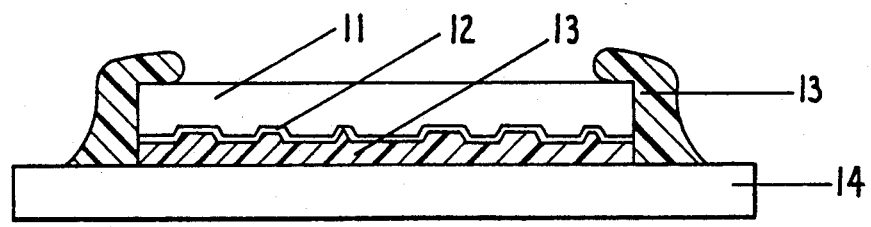
FIG. 3 is a duplicate of FIG. 2 except that the edges along the perimeter of the hologram have been sealed with a thermoplastic adhesive.
Figure 4:
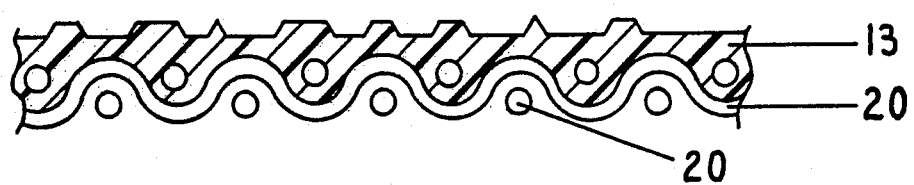
FIG. 4 is a more accurate depiction of the woven fiber composition of the shirt fabric and the interface between the adhesive and the fabric.
Figure 5:
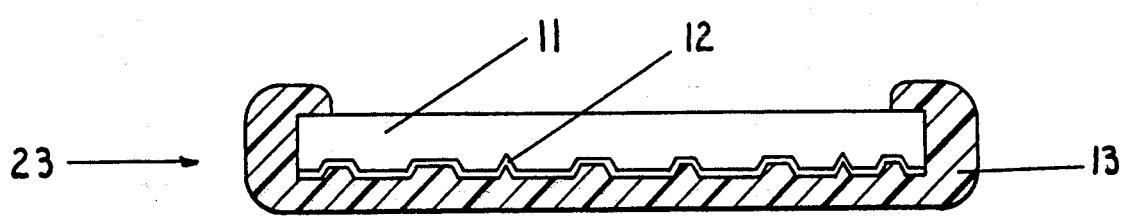
FIG. 5 is a cross-sectional view of a hologram whose edges have been sealed with adhesive independently of any particular substrate.

FIG. 1 is an example of a hologram combined with a silk-screened graphic. The hologram reflects a three-dimensional image of the Golden Gate Bridge while the printed graphic depicts a San Francisco cable car. Another variation for a total graphic combining holographic materials with printed graphics would place the printed graphic directly on the top surface of the plastic carrier of the hologram or diffraction grating. Suitable inks for the latter are available from Ink Dezyme International Ltd. of Toronto, Ontario, Canada, and are identified as multi-purpose inks of the MP-000 Series. These inks are available in many colors and can be applied using direct and indirect photostencils or water-soluble knife-cut stencils with or without thinners available from the same source.

Another process that can be utilized to form a printed graphic to accompany a hologram or diffraction grating involves the use of sublimination printers that are available from Stahls of St. Clair Shores, Mich., or XPRES of Winston-Salem, N.C. These printers use sublimation powders or printer ribbons to produce heat transfers which release sublimination inks in a wide variety of very distinctive colors when applied to a substrate with a heat transfer machine. It has now been discovered that these printers can also be used to print directly on the top surface of holographic films. The more conventional approach would be to produce heat transfers first and apply them to substrates such as fabrics or holographic films, preferably after spraying the substrate with a preparatory coating such as Stahl's Sublimation Prep Spray Concentrate. With either approach the application of heat at approximately 380 degrees Fahrenheit for about 20 seconds will release the dye which will penetrate the plastic top layer of a holographic film. Unlike an opaque printing ink which lies on the plastic surface of the film, the sublimation ink will allow the image or pattern embossed into the film to reflect through the plastic without interfering with its transparency. The resulting combination of vivid sublimation ink colors and a three-dimensional holographic image or pattern produces a very distinctive effect.

The processes and products of the invention disclosed herein represent preferred embodiments of the invention. Many other variations are possible but are impossible to disclose in their entirety. It should also be understood that the words and drawings used are merely descriptive and illustrative and are not intended as exact representations of or inflexible limitations on the spirit and scope of the invention disclosed herein which can only be measured by the legally valid scope of the appended claims.

We claim:

1. A holographic product suitable for attachment to a substrate comprising a transparent plastic top layer, a moisture impermeable adhesive bottom layer, an intermediate mirror-like layer of a metallic material which engages the said top layer to form an embossed surface capable of reflecting the holographic image or a diffraction grating pattern through the said top layer in the presence of light, and a seal along the entire perimeter of the assembly of said layers that binds the said layers together at the outside edges of the said layers making up the same assembly and thereby substantially prevents separation of the said three layers by either ordinary wear and tear or penetration by moisture.

2. The holographic product of claim 1 wherein the seal at the perimeter is provided by enveloping the edges of the product with the adhesive used as the bottom layer.

3. An interfaced assembly comprising the holographic product of claim 1 bonded to a fabric substrate with a water impermeable adhesive.

4. The product of claim 1 wherein the embossed surface is adapted to produce a diffraction grating pattern.

5. An interfaced assembly comprising the holographic product of claim 1 as the top layer, a fabric substrate as the bottom layer, an intermediate layer of a thin, smooth-surfaced, plastic film material that is bound to the fabric substrate by a moisture impermeable thermoplastic adhesive that not only binds to the fabric but also is capable of providing a moisture-impermeable seal underneath and along the entire perimeter of the assembly when heat and pressure are applied to the entire assembly.

6. In a process for producing embossed iron-on holographic films suitable for attachment to a substrate the improvement which comprises sealing the edges along the perimeter of the holographic film sufficiently to substantially inhibit penetration by moisture between the layers of the holographic film.

7. The process of claim 6 wherein the holographic film reflects a diffraction grating pattern.

8. A process of interfacing a display hologram or a diffraction grating with printing for creating a total graphic, comprising in sequence, printing a graphic upon a fabric substrate with an adhesive silk screen printing ink, drying said printing ink, loading said substrate onto a lower platen of a thermostatically controlled heat transfer machine, inserting a heat radiating metal plate between said lower platen and an underside of said substrate against the rear side of a portion of the printed graphic of said substrate, said plate being of a contoured shape and of sufficient size to underlay the film that is to be placed upon a portion of said printed graphic, placing a film having the hologram or diffraction grating thereon on said printed graphic in registry with said metal plate with said ink underlying the entire area of said film, placing a glossy coated release paper on said film and on the remaining portion of said printing ink not covered by said film, said paper holding said film flat and preventing it from shifting, lowering an upper-heated element of said heat transfer machine onto said paper with sufficient heat and pressure to melt and soften said ink, said upper element radiating heat therefrom to said metal plate, said heat being reflected to a rear side of said ink while the top side of said ink is heated by said upper element, said heat being retained for a period of time, removing said upper heating element and said glossy paper and recovering said substrate including said graphic having said ink oozed upwardly around the edges of said film whereby said film is embedded in said ink to provide a strong bond while leaving a smooth, satin-finished surface on said film and ink.

9. The process recited in claim 8 wherein said adhesive is a plastisol underlying the entire area of said film in contact with said substrate and said film is the sole ornamentation on said substrate.

10. The process recited in claim 8 wherein sizing on the rear side of said film cooperates with the adhesive ink on said substrate to seal the edges of said film and form a strong bond between said film and said substrate.

11. The process recited in claim 8 wherein the image on said film is a hologram.

12. The process recited in claim 8 wherein the image on said film is a diffraction grating.

13. An interfaced assembly having a fabric substrate, an embossed hologram having a holographic or a diffraction grating image thereon, and a plastisol adhesive underlying the entire area of said film in contact with said substrate and also encasing the perimeter of said film to provide a seal behind and at said perimeter of said film whereby repeated immersion of said assembly in water will not result in separation of said film from said substrate.

14. The interfaced assembly recited in claim 13 wherein the image on said film is a hologram.

15. The interfaced assembly recited in claim 13 wherein the image on said film is a diffraction grating.

16. The interfaced assembly recited in claim 13 wherein said substrate has a coordinating visual design printed thereon extending beyond the edges of said film.

17. An interfaced assembly comprising a fabric substrate having a printed design thereon, a film having a holographic or a diffraction grating image thereon, and an adhesive silk screen printing ink underlying the entire area of said film in contact with sizing on the underside of said film whereby the printed design on said substrate cooperates with the image on said film to provide a total graphic and the adhesive ink and sizing together curl around and embed the edges of said film so as to prevent said film from peeling off or becoming detached during use and laundering.

18. The interfaced assembly recited in claim 17 wherein the image on said film is a hologram.

19. The interfaced assembly recited in claim 17 wherein the image on said film is a diffraction grating.

20. The interfaced assembly recited in claim 17 wherein the adhesive underlies only that portion of said film which constitutes and is immediately adjacent the perimeter.

21. An interfaced assembly comprising a fabric substrate having a printed design thereon, a film having a holographic or diffraction grating image thereon designed to overlay and cooperate with a portion of said printed design to provide a total graphic, an adhesive silk screen printing ink durable in the presence of wear and laundering overlying the entire area of said substrate overlaid by said film, said adhesive bonding together said fabric substrate and said film with said adhesive curling around and embedding the edges of said film so as to prevent said film from peeling off or becoming detached during use or repeated laundering.

22. An interfaced assembly having
   a non-textile substrate selected from the group consisting of metal, wood, plastic, ceramic, leather, Masonite, glass, and paper,
   a film having a holographic or a diffraction grating image thereon,
   and a plastisol adhesive underlying the entire area of said film in contact with said substrate and also encasing the perimeter of said film to provide a seal behind and at said perimeter of aid film
whereby repeated immersion of said assembly in water will not result in separation of said film from said substrate.

23. An interfaced assembly comprising
   a substrate selected from the group consisting of metal, wood, plastic, ceramic, leather, Masonite, glass, and paper,
   a film having a holographic or a diffraction grating image thereon,
   and an adhesive silk screen printing ink underlying the entire area of said film in contact with sizing on the underside of said film
whereby the printed design on said substrate cooperates with the image on said film to provide a total graphic and the adhesive ink and sizing together curl around and embed the edges of said film so as to prevent said film from peeling off or becoming detached during use.

* * * * *